United States Patent [19]

Jakabhazy

[11] 4,377,481

[45] Mar. 22, 1983

[54] BLENDED, POLYMERIC, MATRIX MEMBRANE AND PROCESS OF MAKING AND USING SAME

[75] Inventor: Stephen Z. Jakabhazy, Weston, Mass.

[73] Assignee: Abcor, Inc., Wilmington, Mass.

[21] Appl. No.: 206,847

[22] Filed: Nov. 14, 1980

[51] Int. Cl.$^3$ ............................................. B01D 31/00
[52] U.S. Cl. .................................. 210/500.2; 264/41; 521/27
[58] Field of Search ............... 210/500.2; 521/27, 405; 427/316; 264/41, 185

[56] References Cited

U.S. PATENT DOCUMENTS 3,083,118  3/1963  Bridgeford ............................. 117/47
3,546,142  12/1970 Michaels ........................ 210/500.2 X
3,615,024  10/1971 Michaels ........................ 210/500.2 X
3,642,668  2/1972  Bailey et al. ....................... 210/2.5 M

FOREIGN PATENT DOCUMENTS 66509  6/1979  U.S.S.R. ......................... 210/500 M

Primary Examiner—Frank A. Spear, Jr.
Attorney, Agent, or Firm—Richard P. Crowley

[57] ABSTRACT

A blended, polymeric membrane which comprises a water-insoluble matrix polymer and a water-insoluble copolymer compatible and blended with the matrix polymer, which copolymer is prepared by a copolymerization of a first monomer which, when homopolymerized, would result in an incompatible homopolymer with the matrix, and a second monomer which, when homopolymerized, would result in a compatible homopolymer with the matrix, one or both of the monomers containing positive or negative functional groups, to provide a blended, compatible, water-insoluble membrane for use in a reverse-osmosis and ultrafiltration processes.

40 Claims, No Drawings

BLENDED, POLYMERIC, MATRIX MEMBRANE AND PROCESS OF MAKING AND USING SAME

BACKGROUND OF THE INVENTION

Polymeric membranes, suitable for use in ultrafiltration and reverse-osmosis processes, are prepared typically by casting, or otherwise forming, the membrane in sheet, tubular, hollow-fiber, spiral or other form from a casting solution containing the desired polymer. It is often desirable, depending upon the particular ultrafiltration or reverse-osmosis process, to prepare polymeric membranes having either positive or negative functional groups incorporated into the polymeric membrane, or to form polymeric membranes having a blend of different polymers, in order to provide different functional characteristics to the resulting polymeric membrane.

A number of difficulties associated with the preparation of blended polymeric membranes is that, in some cases, the direct blending of the polymers or the grafting of monomers onto a matrix-supporting polymer is inhibited, due to the limited choices of desirable solvents for use in the casting solution, or, where the casting solution is formed, the solution is noncastable or nonusable, due to gelation of the casting solution, physical separation of one or more of the ingredients of the casting solution, or other incompatibilities. Another difficulty associated with the preparation of blended polymeric membranes is related to the water solubility of some of the polymers employed in the casting solution. Thus, where a particular, water-soluble homopolymer or copolymer is blended in with another polymer in the casting solution to prepare a blended-polymer membrane, the water-soluble polymer may be leached out of the blended membrane, for use in the ultrafiltration or reverse-osmosis process. A further problem associated with the preparation of blended polymeric membranes occurs after the casting solution is prepared and the membrane formed from the casting solution. It is sometimes found that, in the membrane so formed, on inspection and after evaporation or diffusion of the casting solvent, the polymers making up the membrane are totally incompatible. Thus, for example, while in solution, two or more polymers may be compatible, but, in solid, dry or semidry form, the polymers are incompatible, and, on drying, may provide a visual appearance of incompatibility, such as a white, chalky film or cracks or crazing on the surface, or the membrane may have nonvisual effects and otherwise fail to form a proper membrane suitable for use in an ultrafiltration or reverse-osmosis process. Incompatibility in the dry, blended membrane often indicates that, during coacervation of the casting solution as the membrane is formed, the polymers separate in separate microregions, mostly between the polymeric forms, instead of forming a blended, compatible, water-insoluble, interpenetrating polymer network, which prevents substantial leaching of the water-soluble polymer, and provides for the formation of a compatible, blended polymer.

It is desirable to provide for blended polymeric membranes of desired polymeric characteristics and functional groups, which may be blended into a matrix or supporting polymer in an easy, rapid, effective and economical manner, without the difficulties associated with the preparation of past, blended, polymeric membranes.

SUMMARY OF THE INVENTION

My invention relates to a blended polymeric composition suitable for use as a membrane in ultrafiltration and reverse-osmosis processes, and to the process of preparing and using the improved, blended, polymeric membrane. In particular, my invention concerns the blended polymeric membrane and the process of preparing the membrane and using the membrane, and which blended membrane comprises a matrix polymer blended with a copolymer having positive, negative or neutral, but polar, functional groups.

It has been discovered that blended polymeric compositions suitable for use in membrane processes, such as for reverse-osmosis and ultrafiltration processes, may be prepared easily by the copolymerization of monomers, one of which of the homopolymers would not be compatible with the matrix, or where, if the homopolymers are compatible, they would be water-soluble and, after blending, would be leached substantially out of the matrix polymer. By the proper selection of suitable comonomers employed to prepare the copolymers, it has been found that desirable functional characteristics can be imparted to the water-insoluble, blended, membrane polymer containing the basic matrix polymer, such as, for example, the monomers may contain positive, negative or polar groups or other desirable physical or chemical groups and properties to be imparted to the blended, compatible, polymeric membrane.

My blended polymers avoid the difficulties associated with grafting of particular functional groups onto a matrix polymer, which grafting process is often detrimental to one or more characteristics of the matrix polymer, and typically only leads to a small level or amount of grafting. My invention thus permits the preparation of a blended polymeric membrane, wherein a first monomer, whose homopolymer is water-insoluble, and a second monomer, whose homopolymer is water-soluble, may be copolymerized, to provide a blended membrane which is water-insoluble and wherein the copolymer is compatible in the solid matrix polymer. Thus, my blended polymeric membrane provides a polymer that is not soluble in water, but forms a clear, compatible, membrane film, when blended with the matrix polymer in solution, cast and dried.

Thus, a blended polymeric membrane is prepared, which membrane comprises a matrix polymer, typically a water-insoluble polymer, which provides membrane support and strength to the resulting polymeric membrane, and typically may be an inert polymer subject to variations in pH, temperature and cleaning conditions, and a copolymer, typically a water-insoluble copolymer, which copolymer is compatible with and intimately blended in, and interpenetrating with, the matrix polymer. The copolymer is soluble in the casting solution with the matrix polymer, and, after casting to a membrane, remains compatible with the matrix polymer. The copolymer is prepared, either separately or in the presence of the matrix polymer, in a solvent solution, by the copolymerization in the presence of various initiating agents of a first monomer and a second monomer.

The first monomer is a water-insoluble and oil-soluble monomer which, when homopolymerized, would result in a homopolymer which would be compatible with the matrix polymer of the membrane, both in the casting solution and on casting, but often such first monomer does not contain positive or negative groups. The second monomer is a monomer which, when homopolymerized, would result in a homopolymer which would be incompatible with the matrix polymer of the membrane, either in the casting solution or, more typically, after preparation of the cast membrane, or which homopolymer would be water-soluble, and, even though soluble in the casting solution with the matrix polymer and forming a compatible membrane after casting, would substantially leach out of the matrix-polymer structure during use.

The second monomer may be water- or alcohol-soluble and often contains a positive or negative group which is desired to be imparted to the resulting, blended, polymeric membrane, such as, for example, the employment of positive or negative groups for the use of the blended polymeric membrane in the separation of water emulsions or in the electrocoating operation for the separation of cationic or anionic, aqueous, paint compositions. The proper selection of the first and second monomers, and other monomers, to be copolymerized, provides for reduced water solubility and improved compatibility in the solid phase with the matrix membrane of the resulting copolymer. The resulting, blended, polymeric membrane thus may have desired hydrophilic- and hydrophobic-balanced properties and overcomes the limitations concerning the employment of functional groups through grafting techniques.

The matrix polymer to be selected includes a wide variety of polymers which provides the necessary support and strength to the resulting polymeric membrane. For example, the polymer comprises a water-insoluble polymer which tends to be inert in nature, so that the polymeric membrane may be subject to variations in temperature and pH and present a sufficient strength and chemical and abrasion resistance, so that the surface of the membrane may be cleaned, which is particularly desirable for use in food and dairy operations. Strong alkaline cleaning solutions are employed, and scrubbing of the membrane surface occurs. The matrix polymer may, for example, comprise homopolymers or copolymers, typically of halogenated polymers, and would include, but not be limited to, polymers such as those homopolymers and copolymers derived from vinylidene halide, such as polyvinyl fluoride, such as polyvinylidene fluoride, and copolymers with other fluoro and chloro monomers, such as copolymers with hexafluoro propane or trifluorochloro ethane, or other polyhalo alkanes, as well as halogenated vinyl-halide polymers and copolymers, such as those derived from using vinyl chloride, particularly chlorinated vinyl chloride, along with other monomers. The matrix polymer normally comprises a majority of the weight percent of the blended polymeric membrane, while the copolymer, compatibly blended therewith, forms a minority and in an amount suitable to provide the desired resulting membrane characteristics.

The copolymers of the blended polymeric membrane of my invention are prepared by copolymerizing at least two monomers, usually organic monomers or prepolymers; however, it is recognized that other monomers or mixtures of monomers may be employed in minor amounts, to alter the physical and chemical characteristics of the copolymers employed, if desired. The first monomer employed should be of such a character as to impart water insolubility and as to impart compatibility with the matrix polymer, and whose homopolymer is substantially or fully compatible, both in the casting solution and after preparation of the blended membrane in final form with the matrix polymer.

A wide variety of monomers may be selected as suitable for this purpose; however, it has been found that monomers, which result in water-insoluble copolymers and homopolymers and which increase or bring about compatibility of the total copolymers with the matrix, are most desirable. Such monomers include, but are not limited to: acrylate and methacrylate monomers, such as monoacrylates and monomethacrylates, such as methyl methacrylates; cyclohexyl methacrylates; iso-decyl acrylates; iso-decyl methacrylates; lauryl acrylates; lauryl methacrylates; methoxyethyl acrylates; normal hexyl acrylates; n-butyl methacrylates; propyl methacrylates; perfluoroalkane methacrylates; tetrahydrofurfuryl acrylates; and tetrahydrofurfuryl methacrylates, and typical cross-linking monomers would include allyl methacrylates and ethylene glycol dimethacrylates. Various diluent monomers may be employed, as required or necessary, such as epoxy and other monomer diluents, such as allyl glycidyl ether and phenyl glycidyl ether and glycidyl methacrylates. The preferred first monomer comprises methyl methacrylate or alkyl methacrylate, since they tend to be more stable, on exposure to alkaline cleaning solutions, than the corresponding acrylates.

The second monomer employed, in preparing the copolymer, comprises a monomer which contributes hydrophilic properties to the resulting, blended, polymeric membrane, and whose homopolymer is water-soluble and incompatible, or substantially incompatible, with the matrix polymer, either in the casting solution, due to phase separation, or in the resulting, final, polymeric membrane, or the monomer, although compatible both in the casting solution and in the final membrane form, may be a monomer whose homopolymer is water-soluble, or substantially water-soluble, and which, instead of forming an interpenetrating network within the matrix polymer, becomes leached out of the matrix polymer, during use in a reverse-osmosis or ultrafiltration process.

Such second monomer may vary in composition, but usually is a monomer which contains cationic or anionic groups, such as positive or negative groups, alone or in various combinations. Where a blended polymeric membrane with negative-charged groups is used, such as for the separation of oil-in-water emulsions, or for use in the dairy field, such as the concentration of whey solutions, it is often desirable to employ, or have within the blended polymer membrane, a strongly charged, negative, acid group, usually a carboxylic-acid group and, more particularly, a phosphonic- or sulfonic-acid group, as part of the second monomer.

Where the resulting, blended, polymeric membrane may be employed, for example, with the concentration of aqueous, cationic, electrocoating-paint solutions, then the blended membrane desirably should contain a positively charged nitrogen atom in the form of a secondary or tertiary amino groups, and more particularly, a quaternary-ammonium group. The quaternary-ammonium group may be introduced directly through the use of an appropriate polymer, or a secondary- and tertiary-amino-group-containing monomer employed and, subsequently, either in the casting solution or after the blended membrane has been prepared, the secondary or tertiary amino group is then treated, to prepare a quaternized ammonium group in the blended membrane.

The second monomer useful for preparing the copolymers, thus, may comprise a wide variety of monomers, particularly monomers containing positive or negative functional groups, and more particularly are acrylate- and methacrylate-type monomers containing sulfonic acid, or amino groups, or a combination thereof. In one embodiment, wherein a positively charged, blended, polymeric membrane is desired, the second monomer may comprise acrylate and methacrylate monomers, such as alkyl or dialkylaminoethyl acrylates and methacrylates, and more particularly $C_1$–$C_6$ alkyl or dialkylaminoethyl methacrylates. Suitable secondary amino and tertiary amino monomers, for use as the second monomer, include, but are not limited to: dimethylaminoethyl methacrylate; diethylaminoethyl methacrylate; dimethylaminoethyl acrylate; diethylaminoethyl acrylate; and tertiary butylaminoethyl methacrylate. In addition, quaternary-ammonium monomers may be employed, or the secondary amino and tertiary amino monomers may be converted to the quaternary form, such as through the use of a quaternizing agent, which is well known, such as dimethyl sulfate or methyl chloride, either by treatment in the casting solution or in the finished blended membrane.

Where a blended polymeric membrane has, if desired, negative groups therein, the second monomer, for example, comprises, but is not limited to, monomers containing sulfonic-acid groups; for example, a sulfonated monomer, and particularly an acrylamidoalkyl alkane like acrylamidomethyl propane (AMPS). The preferred second cationic monomer would be AMPS, with a first monomer of methyl methacrylate.

A copolymer blended with a matrix polymer, particularly useful for oil-in-water applications, would be a copolymer comprising a copolymer of AMPS and methyl methacrylate. The AMPS component would contribute hydrophilic sulfonic-acid groups to the blended polymer. The AMPS polymer, in homopolymer form, is incompatible with a matrix polymer, such as PVDF in solid form and in the casting solution, and, further, is water-soluble and leaches out of the PVDF matrix membrane. It has been discovered that, by copolymerizing the AMPS with the methyl methacrylate; that is, the first and second monomers, the resulting copolymer is rendered compatible with the matrix polymer, such as PVDF, while the resulting composition is balanced to reduce water solubility, and the resulting copolymer does not become leached out of the membrane in use or when immersed in the water-leaching bath. Blended membrane polymers, prepared with a matrix polymer of vinylidene fluoride and the copolymer of AMPS and methyl methacrylate, provide membranes with very high process flux; that is, over 600 gallons per foot per day at low pressures of 10 to 20 psi, with moderate response to pressure; and moderate flux of 300 to 400 gallons per foot per day at low pressures of 10 to 20 psi, with good response to higher pressures; and a relatively low flux; that is, 100 gallons per foot per day, at low pressures, with excellent response at higher pressures of 500 to 700 gallons per foot per day at 50 psi.

The first monomer of the copolymer may comprise the use and addition of other monomers. For example, it has been found that copolymers, wherein the first monomer is a perfluorinated acrylate or methacrylate, particularly with AMPS or with tertiary amino acrylates and methacrylates, provide for a blended polymeric membrane, such as, for example, polyfluoroalkyl methacrylates and acrylates, such as $C_1$–$C_8$ fluoro methacrylates, such as octofluoropentyl methacrylate and other monomers. Thus, one preferred embodiment of a copolymer comprises the use of a methacrylate, particularly a lower alkyl methacrylate, as the first monomer and a vinyl sulfonic-acid-containing monomer, such as AMPS, as the second monomer, and particularly a methylallyl, alkylallyl sulfonic acid, vinyl sulfonic acid, or similar monomers.

The blended polymeric membrane typically has a total polymer content of the casting solution as prepared of about 8% to 35% by weight, and more typically 12% to 27%; for example, 15% to 22%, by weight, to provide a casting solution typically having from 10,000 to 100,000 cps at 20° C. The percentage of the copolymer in the blended polymeric membrane may range to up to 50%, but more typically ranges from 10% to 35% by weight, such as, for example, 15% to 25% by weight. The ratio of the first and second monomers of the copolymer may vary, but often ranges from 20% to 80%; e.g., 40% to 60%, but, for example, substantially 50%/50%. Various other minor amounts of polymers and additives may be added to the blended homogeneous polymer or the casting solution, provided that these additives are compatible and result in a compatible, water-insoluble, blended polymer.

The copolymer may be prepared separately, employing the first and second monomers in an organic-solvent solution for the monomers, with the addition of a small, but effective amount of a polymeric initiator, such as various peroxides, such as organic or inorganic peroxides, or azobisisobutyronitrile or other azo initiators. The copolymer then may be blended with the matrix polymer directly into a suitable casting solution containing a solvent and a diluent, if necessary, such as the use of dimethyl acetamide or other solvents for the matrix polymer, and the resulting casting solution then used to form the membrane, either in thin-film, tubular or fiber form.

The membrane may be supported or unsupported, such as, for example, cast onto a support web of a fibrous nature, such as a woven or nonwoven polyolefin, polyester, or other porous structure, and, subsequently, the solvent is evaporated, at least partially, prior to introduction of the partially evaporated, partially cured cast film into an aqueous leaching bath. The thickness of the film, in preparing film and tubular membranes, may range, for example, from 1 to 30 mils, but more typically is 5 to 15 mils, with a curing time of the membrane ranging from 1 to 300 seconds, but more typically 10 to 60 seconds; for example, 10 to 30 seconds. The water-leaching-bath usually ranges in temperature from about 60° F. to 80° F.

It has been found that, even if the copolymer made of the first monomer and the second monomer is insoluble in water, there will be some loss during the water-leaching of the blended polymer, due to the solvent carrying out some of the copolymer during the coacervation process into the leaching bath. This occurs normally every time a mixture of two hydrophobic polymers of different solubility and molecular weight is coagulated. The lower molecular-weight component will exhibit some tendency to leach out. Therefore, it is of practical concern to make the copolymers of the highest possible molecular weight; for example, greater than 10,000 and preferably above 100,000. Furthermore, most copolymerizations lead to a range of comonomer distribution in the resultant copolymer, the consequence of which is that some fraction of the copolymer nearly or completely will be water-soluble, which fraction is lost during the leaching process. Experiments have shown that losses during leaching can reach as high as 30% to 40% of the copolymer under unfavorable conditions (low molecular weight, wide distribution), but that further losses are nonexistent after leaching, even under the harshest conditions.

In one embodiment, the copolymer may be prepared in an organic-solvent solution of a volatile organic solvent, which serves as a solvent for the matrix polymer, as well as the two monomers. The polymerization initiator is added and, after agitating and heating and after standing to form the copolymer, then a solution containing the matrix polymer may be added directly to the polymerization solvent solution, to form the desired casting solution, or, if desired, the matrix polymer and additional solvents and diluents may be added directly to the copolymerization solution, to form the casting solution of desired viscosity.

My blended, homogeneous, water-insoluble, polymeric membrane and the method of preparing such membrane, thus, represents a substantial advance in the membrane art and provides for the economical and rapid preparation of blended membranes containing desired functional and hydrophilic characteristics and overcomes the difficulties associated with the preparation of compatible blended membranes, wherein the homopolymers are attempted to be blended directly into a matrix polymer.

In connection with the description of my blened polymeric membrane and the process of preparing the membrane, the term "compatibility" is used to refer to that condition wherein the matrix polymer and the homopolymer of the second monomer would become phase-separated in a solvent used for the membrane casting solution, or wherein the blended matrix polymer and the same homopolymer, into which it is blended, when prepared to form the polymeric membrane polymer in the solid membrane form, on evaporation and diffusion of the solvents of the casting solution, are or become nonhomogeneous in appearance, or wherein the cast membrane as formed fails to function or result in a satisfactory membrane, due to the separation or microprecipitation of the homopolymer within the matrix, or where the homopolymer in the matrix is or becomes water-soluble and is leached substantially out of the matrix. In my blended polymeric membranes, the copolymer is intimately and interpenetratingly blended with the matrix polymer and cannot be removed in the leaching bath or in use, and, thus, while exhibiting hydrophilic characteristics, the resulting polymeric membrane is water-insoluble.

My invention will be described in connection with certain specific embodiments. However, it is recognized that those persons skilled in the art may make various changes and modifications in the described embodiments, all falling within the nature, scope and intent of my invention.

DESCRIPTION OF THE EMBODIMENTS

Preparation of nitrogen-containing (cationic) copolymers

Example 1

480 g dimethylacetamide (DMAc), 194.5 g dimethylaminoethyl methacrylate (DMAEMA) and 125.5 g methyl methacrylate (MAA) were combined in a polyethylene container at room temperature. 0.580 g azobisisobutyronitrile (AIBN) initiator was dissolved in the mixture. For one hour, high purity (oxygen-free) nitrogen was bubbled through the solution. The container was quickly closed tightly and placed in a 60° C. oven over a period of four days. The copolymer solution at this point is ready to be used for the preparation of casting solutions. This formulation represents a 50/50 mole % composition with 40% total solids.

Example 2

60 g DMAc, 19.35 g vinylimidazole (VI) and 20.65 g MMA were combined in an Erlenmeyer flask and 0.01 g AIBN was dissolved in the mixture. Copolymerization was carried out as in Example 1.

Preparation of an anionic copolymer

Example 3

8000 g DMAc, 2000 g 2-acrylamido-2-methyl propane sulfonic acid (AMPS), 2000 g MMA and 0.4 g AIBN were combined. Preparation and copolymerization were carried out as in Example 1. This copolymer is of a 50/50 weight % composition.

Example 4

240 g DMAc, 105 g AMPS (65.15 weight % in resultant copolymer), 43 g octafluoropentyl methacrylate (OFPMA, 27.0%), 12 g cyclohexyl methacrylate (CHMA, 7.7%), 0.24 g glycidyl methacrylate (GMA, 0.15%) and 0.016 g AIBN were combined and copolymerized as in Example 1.

Preparation of nitrogen-containing (or cationic) blended membranes

Example 5

25.5 g of a DMAEMA-MMA copolymer solution (having a 40% total polymer concentration and a 50/50 mole % comonomer distribution in DMAc), 33.8 g of PVDF and 140.6 g N-methyl pyrrolidone (NMP) were mixed until all components dissolved. Membranes were cast at 25-mil thickness, which includes the nonwoven substrate. The curing time was five seconds. Membranes were leached in pure water. These membranes gave 32 GFD fluxes on cationic paint with a clear permeate. The state-of-the-art membrane typically would give 15 to 17 GFD fluxes on the same cationic paint. Fouling rates were significantly slower of the experimental membranes.

Example 6

A 100 g aliquot of the casting solution described in Example 5 was treated with 1.4 ml methyl iodide, to achieve quaternization of the N-containing moiety. The solution was heated at 80° C. over several hours. Membranes were prepared as given in Example 5. Fluxes were found to be 34 GFD on cationic paint, with an even more improved fouling rate.

Example 7

8.0 g of a 50/50 mole % vinylimidazole/MMA copolymer (of 40% total solids in DMAc), 70.0 g NMP and 20.0 g PVDF were mixed. Membranes were made as in Example 5. Optional quaternization can be carried out as in Example 6. Membrane performances on cationic paint were similar to those in Examples 5 and 6.

Preparation of anionic-polymer-blend membranes

Example 8: AMPS/MMA with PVDF 28 g of an AMPS/MMA copolymer (40 wt% copolymer, 60 wt% DMAc with a 50/50 wt% monomer composition) solution were mixed with 215 g NMP. After complete mixing, 57 g PVDF were added during continued agitation, with total exclusion of atmospheric conditions. The solution was heated to 105° C. for a period of one hour, after all components were visibly dissolved.

Membranes were cast on nonwoven backing, having a thickness over the backing of 15 mils. After five-second curing time, the membranes were leached in pure water at room temperature.

Membranes prepared by this method gave 350 GFD at 10 psi and 740 GFD flux at 50 psi, when tested on a synthetic oil emulsion. The permeate contained less than 20 mg/l hydrocarbon. Membranes after use contain less than 0.1% oil, while the control can contain as high as 35% oil.

Example 9: Straight PVDF (control)

A comparable membrane containing only PVDF can be made by dissolving 22.7 g PVDF in 77.3 g NMP. After treating the casting solution and casting membrane as above, the resulting membrane gives only 25 GFD flux at 10 psi and 70 GFD at 50 psi, using the same emulsion as in Example 8. The permeate can contain as much as 200 to 1000 ppm hydrocarbon. Membranes after use contain typically 30% to 35% oil.

Example 10

Membranes composed of 26.7% of a copolymer of AMPS/cyclohexyl methacrylate (CHMA) (in 60/40 weight % distribution) and 73.3% PVDF were prepared in a manner similar to that described in Example 8. On the same emulsion, the observed fluxes were 110 GFD at 10 psi and 600 GFD at 50 psi with clear permeate.

Example 11

23.0 g copolymer of AMPS and octafluoropentyl methacrylate (OFPMA) and 40% concentration in DMAc and of 40.8/59.2 weight ratio, 34.5 g PVDF and 122.5 g DMAc were mixed and heated as in Example 8. Membranes were cast as indicated in above example. On synthetic emulsions, these membranes gave 400 GFD flux at 10 psi and 1,050 GFD at 50 psi, all with permeates containing less than 20 ppm hydrocarbon.

Example 12: (VF$_2$-CTFE)

Membranes made of 18.6% copolymer (composed of 60 mole % AMPS, 20 mole % OFPMA, 19.9 mole % CHMA and 0.1 mole % GMA (Glycidylmethacrylate) and 81.4% copolymer of vinylidene fluoride and chlorotrifluoro ethylene were prepared and tested as in Example 8. Fluxes were 400 GFD at 10 psi and 625 GFD at 30 psi with clear permeate.

Example 13: (VF$_2$-HFP)

In Example 12, the copolymer of vinylidene fluoride and chlorotrifluoro ethylene was replaced by a copolymer of vinylidene fluoride and hexafluoro propane. Membranes were prepared and tested in a similar manner with similar results.

Example 14: (CPVC)

45 g chlorinated PVC, 45 g copolymer of AMPS/MMA (in 60/40 weight ratio and in 40% DMAc solution) and 210 g DMAc were mixed to prepare the casting solution. Membranes were prepared by casting over a nonwoven support with a 16-mil thickness (including the support) and after a ten-second curing time. Fluxes on synthetic emulsions were 220 GFD at 10 psi and 1,300 GFD at 50 psi. Permeates were totally clear.

Example 15

50 g of a copolymer of vinylbenzylchloride (VBC) with MMA (50/50 weight ratio and 80% in DMAc), 60 g PVDF and 325 g DMAc were used to prepare a solution.

A 100 g aliquot of this solution was reacted with diethanol sulfide to produce sulfonium ion-containing membranes.

Another 100 g aliquot of above solution was reacted with triphenyl phosphite, in order to obtain phosphonium ion-containing membranes.

A third 100 g aliquot part of the solution was treated with thiolacetic acid. Membranes made from this solution were subsequently oxidized, in order to obtain sulfonic-acid-containing moiety.

Having thus described my invention, what I claim is:

1. A blended polymeric membrane, which membrane comprises:
   (a) a water-insoluble matrix polymer, to provide support and strength to the membrane; and
   (b) a water-insoluble copolymer compatible with and intimately blended with the matrix polymer in an amount of up to about 50% by weight in the blended polymeric membrane, which copolymer is prepared by the copolymerization of
      (i) a first monomer which comprises an acrylate or methacrylate monomer which, when homopolymerized, would result in a water-insoluble homopolymer compatible with the matrix polymer of the membrane, and
      (ii) a second monomer which contributes hydrophilic properties to the blended polymeric membrane and which contains cationic or anionic groups, or combinations thereof selected from the group consisting of quaternary ammonium, amino, sulfonic, carboxylic, sulfonium, phosphonic, phosphonium, and hydroxyl groups, and which, when homopolymerized, would result in a homopolymer incompatible with the matrix polymer of the membrane the first or second monomers present in the copolymer in an amount of up to 80% by weight, thereby providing for the compatible blending of the incompatible second monomer function into the matrix polymer.

2. The membrane of claim 1 wherein one of the monomers contains a positive, negative, or uncharged polar functional group.

3. The membrane of claim 1 wherein one of the monomers contains a positive nitrogen-atom group.

4. The membrane of claim 1 wherein one of the monomers contains a negative sulfonic or hydroxyl group.

5. The membrane of claim 1 wherein the matrix polymer comprises a halogenated organic polymer.

6. The membrane of claim 1 wherein the matrix polymer comprises a vinylidene fluoride polymer or copolymer.

7. The membrane of claim 1 wherein the matrix polymer comprises a chlorinated vinyl-chloride polymer or copolymer.

8. The membrane of claim 1 wherein the weight percent of the copolymer of the membrane polymer ranges from about 10 to 35 weight percent.

9. The membrane of claim 1 wherein the weight percent of one monomer of the copolymer ranges from 20 to 80 weight percent.

10. The membrane of claim 1 wherein the first monomer comprises an alkyl methacrylate.

11. The membrane of claim 1 wherein the second monomer comprises a monomer containing a secondary or tertiary amino group.

12. The membrane of claim 11 wherein the second monomer comprises an alkyl secondary or tertiary aminoethyl methacrylate or acrylate.

13. The membrane of claim 1 wherein the second monomer is a water-soluble, sulfonated, methacrylamido or acrylamido monomer.

14. The membrane of claim 1 wherein the matrix polymer comprises a polyvinylidene fluoride or a chlorinated vinyl-chloride polymer, and wherein the first monomer of the copolymer comprises methyl methacrylate, and the second monomer of the copolymer comprises an acrylamidomethyl propane sulfonic acid.

15. The membrane of claim 1 wherein the matrix polymer comprises a polyvinylidene fluoride polymer or a chlorinated vinyl-chloride polymer, and the first monomer comprises a methyl methacrylate, and the second monomer comprises a dimethylaminoalkyl methacrylate or a tertiary butylaminoalkyl methacrylate.

16. The membrane of claim 1 wherein the copolymer is a nitrogen-containing cationic copolymer, and wherein the first monomer is methyl methacrylate, and the second monomer is selected from the group consisting of dimethylaminoethyl methacrylate vinyl benzylchloride and vinylimidazole.

17. The membrane of claim 1 wherein the copolymer is an anionic copolymer, and wherein the first monomer is selected from the group consisting of methyl methacrylate and cyclohexyl methacrylate and octafluoropentyl methacrylate, and the second monomer comprises 2-acrylamido-2-methyl propane sulfonic acid.

18. The membrane of claim 1 wherein the copolymer has a molecular weight of greater than about 10,000.

19. The membrane of claim 1 wherein the first monomer comprises a methyl methacrylate and the second monomer comprises an acrylamido methyl propane sulfonic acid.

20. The membrane of claim 1 wherein the first monomer comprises a polyfluoroalkyl methacrylate.

21. The membrane of claim 1 wherein the copolymer comprises from about 10% to 35% by weight of the blended polymeric membrane, and the first and second monomers of the copolymer comprise from about 40% to 80% by weight of the copolymer, the copolymer having a molecular weight of greater than 10,000.

22. A blended polymeric membrane, which membrane comprises:
(a) a vinylidene fluoride matrix polymer; and
(b) a copolymer compatible with and intimately blended with the matrix polymer, which copolymer is prepared by the copolymerization of a water-soluble, sulfonated, amido acrylate monomer and a water-insoluble acrylate or methacrylate monomer, wherein the weight percent of the copolymer, based on the membrane polymer, ranges from about 10% to 35% by weight, and wherein the weight percent of the monomers of the copolymer ranges from about 20% to 80% by weight.

23. A blended polymeric membrane, which membrane comprises:
(a) a vinylidene fluoride matrix polymer; and
(b) a copolymer compatible with and intimately blended with the matrix polymer, which copolymer is prepared by the copolymerization of a water-soluble, secondary or tertiary aminoethyl acrylate monomer and a water-insoluble acrylate or methacrylate monomer, wherein the weight percent of the copolymer, based on the membrane polymer, ranges from about 10% to 35% by weight, and wherein the weight percent of the monomers of the copolymer ranges from about 20% to 80% by weight.

24. A process of preparing a blended polymeric membrane, which process comprises:
(a) casting a solvent solution of a casting solution containing a polymer blend;
(b) evaporating at least partially the solvent of the casting solution;
(c) immersing the cast, partially evaporated, polymer film into a water bath; and
(d) recovering a blended polymeric membrane, the improvement which comprises
providing an organic-solvent casting solution, which solution comprises a water-insoluble matrix polymer to provide support and strength to the polymeric membrane to be prepared, and a water-insoluble copolymer soluble in the organic solvent and compatible with and intimately blended with the matrix polymer, after formation of the membrane, in an amount of up to about 50% by weight in the blended polymeric membrane, which copolymer is prepared by the copolymerization of a first monomer which comprises an acrylate or methacrylate monomer and which, when homopolymerized, would result in a water-insoluble homopolymer compatible with the matrix polymer of the membrane and which would be soluble in the casting solution, and a second monomer which contributes hydrophilic properties to the blended polymeric membrane and which contains cationic or anionic groups, or combinations thereof selected from the group consisting of quaternary ammonium, amino, sulfonic, carboxylic, sulfonium, phosphonic, phosphonium, and hydroxyl groups and which, when homopolymerized, would result in a homopolymer incompatible with the matrix polymer of the membrane or would be water-soluble, but which is soluble in the casting solution, the first or second monomers present in the copolymer in an amount of up to 80% by weight.

25. The process of claim 24 which includes copolymerizing the first and second monomers in an organic-solvent solution to form the copolymer, and, thereafter, adding to the organic-solvent solution, in which the copolymerization has been carried out, the matrix polymer and a solvent to form the casting solution.

26. The process of claim 24 wherein the total polymer content of the casting solution ranges from 8% to 35% by weight.

27. The process of claim 24 wherein the casting solution contains dimethyl acetamide or N-methyl pyrrolidone as an organic solvent.

28. The process of claim 24 which includes casting the casting solution in a thin film ranging from about 1 to 30 mils onto a fibrous support backing.

29. The process of claim 24 wherein the viscosity of the casting solution ranges from about 10,000 to 100,000 cps.

30. The process of claim 24 wherein the membrane is formed at a rate of from about ½ of a foot to 20 feet per mintue, and the curing time ranges from about 1 to 300 seconds.

31. The process of claim 24 wherein the first monomer is an acrylate or a methacrylate monomer, and the second monomer contains a secondary or tertiary amino group, and which process includes quaternizing the amino group to form a quaternary-ammonium group.

32. The process of claim 24 wherein the matrix polymer comprises a chlorinated vinyl-chloride polymer or copolymer.

33. The process of claim 24 wherein the weight percent of the copolymer of the membrane polymer ranges from about 10 to 35 weight percent.

34. The process of claim 24 wherein the weight percent of one monomer of the copolymer ranges from about 20 to 80 weight percent.

35. The process of claim 24 wherein the second monomer is a water-soluble, sulfonated, methacrylamido or acrylamido monomer.

36. The process of claim 24 wherein the copolymer is a nitrogen-containing cationic copolymer, and wherein the first monomer is methyl methacrylate, and the second monomer is selected from the group consisting of dimethylaminoethyl methacrylate and vinylimidazole.

37. The process of claim 24 wherein the copolymer is an anionic copolymer, and wherein the first monomer is selected from the group consisting of methyl methacrylate and cyclohexyl methacrylate and octafluoropentyl methacrylate, and the second monomer comprises 2-acrylamido-2-methyl propane sulfonic acid.

38. The process of claim 24 wherein the matrix polymer comprises a vinylidene fluoride polymer or copolymer.

39. The process of claim 24 wherein the first monomer comprises methacrylate and the second monomer comprises acrylamido methyl propane sulfonic acid.

40. The process of claim 24 wherein the second monomer comprises a vinylbenzylchloride, and which includes reacting the solution of the copolymer and the matrix polymer with a reactant, to provide a blended polymeric membrane containing a cationic or anionic group selected from the group consisting of sulfonium ions, phosphonium ions and sulfonic acid.

* * * * *